United States Patent
Dede et al.

(10) Patent No.: US 12,063,009 B1
(45) Date of Patent: Aug. 13, 2024

(54) THERMOPHOTOVOLTAIC (TPV) SYSTEM WITH EVAPORATIVE TWO-PHASE COOLER HAVING 3D ARCHITECTED WICK FOR CELL THERMAL MANAGEMENT

(71) Applicant: Toyota Motor Engineering & Manufacturing North America, Inc., Plano, TX (US)

(72) Inventors: Ercan M. Dede, Ann Arbor, MI (US); Ziqi Yu, Ann Arbor, MI (US); Taehwa Lee, Ann Arbor, MI (US); Shailesh Joshi, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 18/178,213

(22) Filed: Mar. 3, 2023

(51) Int. Cl.
*H02S 40/42* (2014.01)
*H02S 10/30* (2014.01)

(52) U.S. Cl.
CPC ............ *H02S 40/425* (2014.12); *H02S 10/30* (2014.12)

(58) Field of Classification Search
None
See application file for complete search history.

(56) References Cited

U.S. PATENT DOCUMENTS

| | | |
|---|---|---|
| 8,646,281 B2 | 2/2014 | Lim |
| 2003/0230336 A1* | 12/2003 | Malfa ............... H01G 9/2031 136/253 |
| 2008/0251124 A1 | 10/2008 | Uehlin |
| 2010/0275971 A1* | 11/2010 | Zingher ............ H02S 40/22 136/246 |

(Continued)

FOREIGN PATENT DOCUMENTS

| | | |
|---|---|---|
| CN | 102683465 B | 8/2014 |
| IN | 202241050149 A | 9/2022 |
| KR | 1744293 B1 | 6/2017 |

OTHER PUBLICATIONS

Chandrasekar et al., "Passive cooling of standalone flat PV module with cotton wick structures", Energy Conversion and Management 71(14):43-50, DOI:10.1016/j.enconman.2013.03.012, Jul. 2013. (https://www.researchgate.net/publication/257051961_Passive_cooling_of_standalone_flat_PV_module_with_cotton_wick_structures).

Gentillon et al., "A comprehensive experimental characterisation of a novel porous media combustion-based thermophotovoltaic system with controlled emission", Applied Energy 254 (2019) 113721, 13 pages.

(Continued)

*Primary Examiner* — Ryan S Cannon
(74) *Attorney, Agent, or Firm* — Jordan IP Law, LLC (57) ABSTRACT

Thermophotovoltaic (TPV) systems for energy harvesting with thermal management are provided. The systems include a three-dimensional architected wick having a porous structure for delivering a two-phase working fluid via capillary action to maintain efficient cooling of a TPV cell array. The wick is configured to uniformly deliver working fluid for evaporative cooling of the TPV cells. The wick may be in direct thermal communication with the TPV cell or employed to locally deliver working fluid to an evaporator that is in direct thermal communication with the TPV cell. The increased surface area of porous structure of the wick and the evaporator increases heat dissipation and evaporative cooling providing an improvement in temperature distribution and heat transfer critical to maintaining the TPV cell at a constant temperature.

20 Claims, 6 Drawing Sheets

(56) References Cited

U.S. PATENT DOCUMENTS

| | | | |
|---|---|---|---|
| 2013/0049018 A1* | 2/2013 | Ramer | H01L 31/024 977/762 |
| 2015/0198380 A1 | 7/2015 | Haj-Hariri et al. | |
| 2020/0217518 A1 | 7/2020 | Field et al. | |
| 2021/0384865 A1* | 12/2021 | Wang | B01D 61/3641 |
| 2022/0196338 A1* | 6/2022 | Torresin | F28D 15/046 |

OTHER PUBLICATIONS

Lapotin et al., "Thermophotovoltaic efficiency of 40%", Nature, vol. 604, Apr. 14, 2022, pp. 287-307.

Francoeur et al., "Thermal Impacts on the Performance of Nanoscale-Gap Thermophotovoltaic Power Generators", IEEE Transactions on Energy Conversion, vol. 26, No. 2, Jun. 2011, pp. 686-698.

Yang et al., "Development of micro-thermophotovoltaic power generator with heat recuperation", Energy Conversion and Management 78 (2014) 81-87.

* cited by examiner

THERMOPHOTOVOLTAIC (TPV) SYSTEM WITH EVAPORATIVE TWO-PHASE COOLER HAVING 3D ARCHITECTED WICK FOR CELL THERMAL MANAGEMENT

TECHNICAL FIELD

Embodiments generally relate to thermophotovoltaic energy harvesting systems. More particularly, embodiments relate to thermophotovoltaic energy harvesting systems with thermal management.

BACKGROUND

Thermophotovoltaic (TPV) energy harvesting systems typically employ a combustion system found in grid-scale electricity generating applications in combination with a TPV cell system for thermal energy harvesting. TPV systems are a known renewable energy technology that makes more efficient use of fossil fuels. Improving the efficiency, reliability and cost of TPV energy technology has posed unique challenges. Increasing the radiation absorption and power output of TPV cells depends on increasing the proximity of the TPV cell to a high temperature emitter. At the same time, an increase in TPV cell temperature decreases electrical power output. Therefore, it is important to maintain the TPV cell at a constant temperature at millimeter-to-nano-scale distances to the emitter. The disclosure below may set forth an improved cooling system for TPV cell thermal management.

BRIEF SUMMARY

In some embodiments, a thermophotovoltaic system may include an emitter configured to emit energy, a thermophotovoltaic cell configured to absorb energy from the emitter and generate electrical power, an evaporator comprised of porous media, the evaporator coupled to the thermophotovoltaic cell and in thermal communication to absorb heat from the thermophotovoltaic cell, a reservoir containing a two-phase working fluid having a liquid phase and a vapor phase, a wick made of porous media in fluidic communication between the reservoir and the evaporator, wherein the porous media of the wick is configured to deliver the liquid phase of the working fluid from the reservoir to the evaporator by capillary action, and a condenser connected to the evaporator via a main channel and connected to the reservoir via a downcomer such that the vapor phase of the working fluid from the evaporator condenses into the liquid phase and returns to the reservoir.

In some embodiments, a thermophotovoltaic system may include an emitter configured to emit energy, a thermophotovoltaic cell configured to absorb energy and generate electrical power having a frontside facing the emitter, a reservoir containing a two-phase working fluid having a liquid phase and vapor phase, a wick made of porous media having a frontside surface directly attached to a backside of the thermophotovoltaic cell or intermediary substrate, the wick having a bottom end in fluidic communication with the reservoir, the wick having an interconnected pore structure configured for delivery of the liquid phase of the working fluid from the reservoir into the wick and along a length of the thermophotovoltaic cell via capillary action, and a condenser connected to the wick via a main channel and connected to the reservoir via a downcomer, wherein heat is transferred from the thermophotovoltaic cell to the working fluid inside the wick converting the working fluid into the vapor phase generating a pressure head, and wherein the vapor phase of the working fluid enters the main channel and is condensed into its liquid phase which returns to the reservoir via gravity in the downcomer.

In some embodiments, a thermophotovoltaic system may include a central reservoir containing a two-phase working fluid having a liquid phase and vapor phase, the central reservoir having a top end and a bottom end, at least one wick made of porous media having a proximal end in fluidic communication with the bottom end of the central reservoir and extending upwardly from the bottom end and at least, in part, surrounding the central reservoir, at least one evaporator made of porous media, the evaporator having a frontside and a backside, the evaporator extending around and in fluidic communication with the wick such that working fluid is delivered by the wick via capillary action to the backside of the evaporator, at least one thermophotovoltaic cell configured to absorb energy and generate electrical power, the thermophotovoltaic cell having a backside in thermal connection with the frontside of the evaporator, at least one emitter arranged around the thermophotovoltaic cell and configured to emit energy toward the frontside of the thermophotovoltaic cell, and a condenser connected to the evaporator via a main channel and connected to the central reservoir via a downcomer, wherein, to cool the thermophotovoltaic cell, heat is transferred from the thermophotovoltaic cell to the evaporator converting the working fluid into the vapor phase, and wherein the vapor phase of the working fluid enters the main channel and is condensed at the condenser into its liquid phase and returns to the central reservoir via gravity in the downcomer.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings in which:

DETAILED DESCRIPTION

Figure 1:
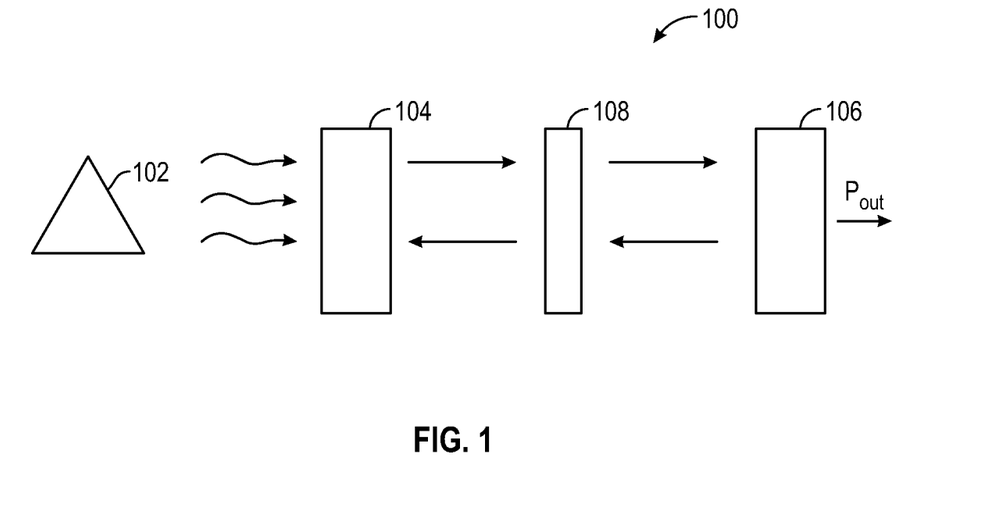
FIG. 1 is a schematic diagram of a TPV system, according to one or more embodiments.

FIG. 1 presents a schematic diagram illustrating a thermophotovoltaic (TPV) system 100 including a heat source 102 providing heat energy to an emitter 104 and a TPV cell 106 receiving radiation and outputting electrical power. A filter 108 may be located between the emitter 104 and the TPV cell.

The heat source 102 may include any high temperature heat source including ones where combustion of fuel such as natural gas, methane, hydrogen, or other hydrocarbon or non-hydrocarbon fuel is the source of heat generation. The fuel may be mixed with air or other gases. During the combustion process, a large amount of heat energy is transferred to the emitter 104. In one embodiment, the wall of the combustor may act as an emitter 104. The heat source 102 is not limited to combustion driven heat generation and any kind of heat source including radiation from any terrestrial thermal energy source such as solar and waste heat emission sources may be used. Heat may be stored in graphite or other thermal storage media in a thermal energy grid-scale storage TPV application with on demand electricity generation by the TPV system 100. Other types of emitters 104 such as silicon and tungsten radiators powered with electricity from any source may be employed.

Figure 2:
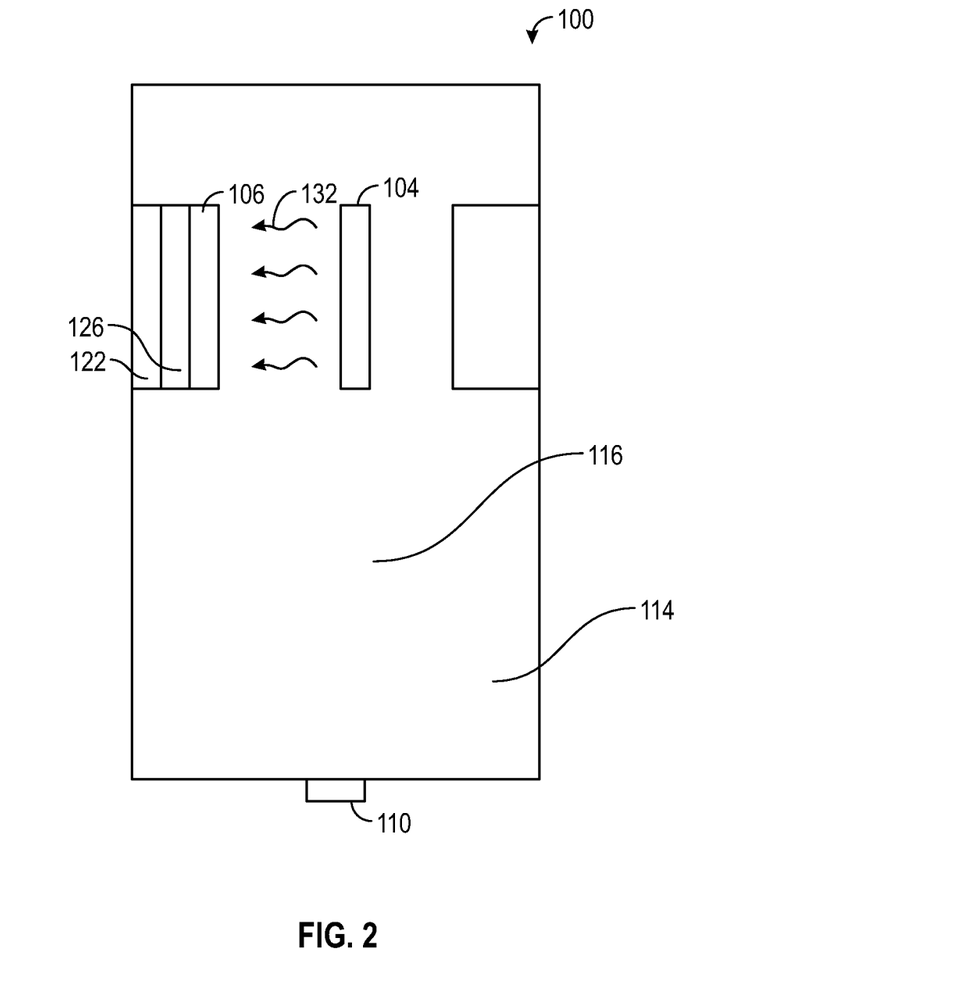
FIG. 2 is a schematic diagram of an exemplary TPV reactor, according to one or more embodiments.

FIG. 2 illustrates a representative TPV system 100 driven by combustion of hydrocarbon fuel gas mixed with air and delivered under pressure via an intake 110 past a pressure sensor to a premix chamber 114. In the premix chamber 114, the fuel and air are well mixed and pre-heated to generate a higher more uniform temperature distribution before flowing into a reactor 116. The reactor 116 is in thermal communication with a ceramic emitter 104. The emitter 104 extends through a length of the reactor 116 between a lower zone and upper zone of the reactor 116. The emitter 104 may be partially surrounded by reflectors. Radiant disks may be included above and below the emitter 104 to recirculate and direct thermal energy 132 at the frontside of an array of TPV cells 106. The TPV cells may or may not be mounted on an intermediary substrate 126 and are connected to a heat sink 122 directly at their backside or indirectly via the substrate 126. A quartz tube to recover and recycle radiation from the emitter 104 may be employed to reheat the combustion zones and the wall of the reactor 116. Recycling heat improves temperature distribution and increases the mean wall temperature. The heat recuperation increases the radiation energy intensity and improves the spectral distribution so that more emitted photons locate at a useful wavelength range. This recuperation increases the electrical power output of the TPV system 100. Thermal radiation 132 emanating from the emitter 104 is received by the array of TPV cells 106.

Figure 3:
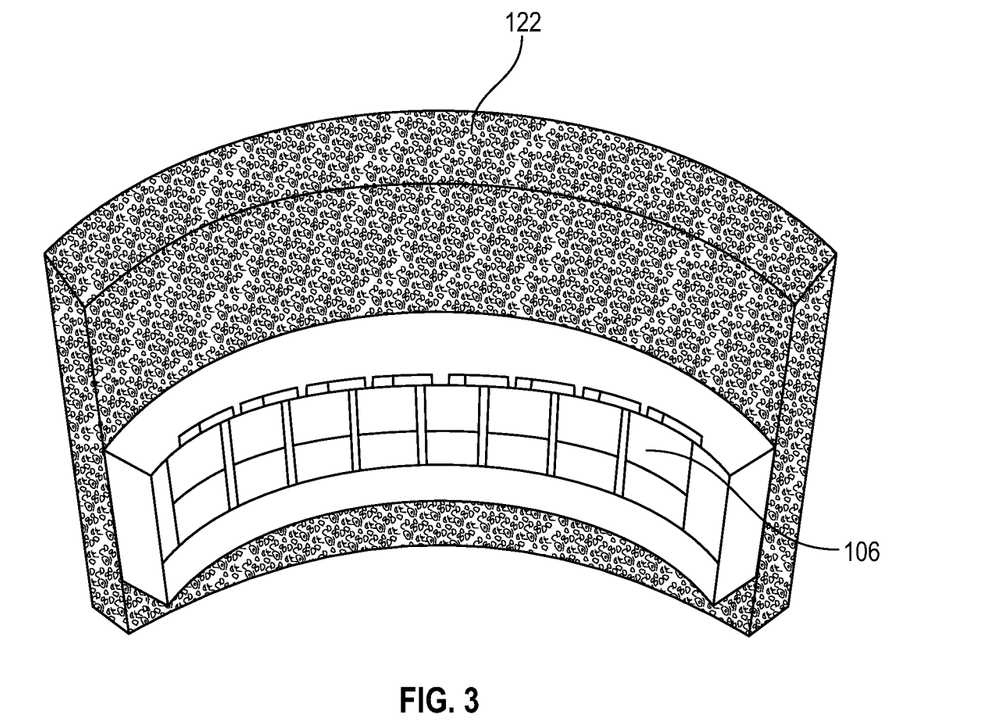
FIG. 3 is a top-perspective view of a TPV cell array to a porous media, according to one or more embodiments.

FIG. 3 illustrates an array of multiple TPV cells 106 configured in a curved configuration to cover an opening of a conformingly curved reactor 116. The array of TPV cells 106 may be configured to at least partially surround and enclose the emitter 104 and may take different form factors depending on the emitter shape (e.g. planar, cylindrical, hexagonal, or the like). A conformingly shaped porous media heat sink 122 is in direct contact with the entire backside of the array of TPV cells 106 (or attached via the aforementioned intermediary substrate) and in thermal communication therewith. The porous media heat sink 122 is part of a larger cooling system that will be discussed in greater detail below.

The TPV cell 106 includes photovoltaic material for converting electromagnetic energy to electric current. This conversion takes place due to the photovoltaic effect in a semiconductor in which crystalline silicon semiconductors become conductive when the energy of the photons absorbed by the crystal surface is sufficient to raise the electron state from the valence band to the conduction band. This required amount of energy to excite an electron is defined as bandgap. Bandgap is an intrinsic property of semiconductors that has a direct influence on the photovoltaic cell voltage. Low bandgap materials such as germanium may be used to capture low energy photons like those in the red and infrared parts of the spectrum and high bandgap materials like copper nitride or gallium phosphide can be used for high energy photons. Combination of different materials in one system allows for a more efficient use of available radiation. If the bandgap of the photovoltaic material is too small compared to the incident photon energy, a significant amount of energy will be converted to heat and if the bandgap is too high, most photons will not cause a photovoltaic effect. Since thermal radiation occurs across a broad spectrum, spectral control is employed to maximize the useful in-band emission of such a heat source 102. Spectral control may be achieved by employing a selective emitter 104 and/or selective filters 108 and reflectors to increase the fraction of radiant energy that forms the in-band fraction in order to produce electrical power. Energy that is below the bandgap of the TPV cell 106 or the out-of-band fraction is reduced via controlled emission or reflection that may lead to secondary heat regeneration that can be used to increase the temperature of the energy source to enhance the overall system efficiency.

Spectral control is illustrated in the schematic diagram of FIG. 1. The selected heat source 102 generates thermal power that is received by the emitter 104. As the emitter 104 reaches a sufficiently high temperature, power of a selective spectrum characteristic of the emitter 104 is emitted toward the filter 108. The filter 108 may absorb this energy and reflect energy back toward the emitter 104 and heat source 102. The reflected energy increases the temperature and improves the spectral efficiency. The filter 108 also transmits radiative power to the TPV cell 106 which generates electrical power Pout. Photons with energy higher than the bandgap energy of the TPV cells 106 will evoke free electrons and generate electricity under the action of a PN junction. The one or more filters 108 recycle the photons with energy lower than the bandgap of the TPV cell 106 reflecting the unwanted unusable sub-bandgap radiation to reduce heat generation in the TPV cell 106 while helping to keep the emitter 104 hot.

A variety of TPV cells may be employed in the TPV system. For example, TPV cells 106 made of gallium antimonide (GbSb), gallium arsenide cells, germanium, indium gallium antimonide, indium gallium arsenide antimonide. TPV cells 106 selected according to their bandgap may be paired with corresponding radiation emitters 104 to maximize efficiency. The front side of the TPV cells 106 face the emitter 104 and are spaced apart therefrom by a distance. This distance between the emitter 104 and TPV cell 106 may be a nanoscale gap for capturing near-field thermal radiation effects and increasing the TPV system 100 efficiency.

The heat flux of the TPV cell 106 increases as the gap distance from the emitter 104 decreases. The radiation absorbed by the TPV cell 106 and maximum electrical power output will also be greater at smaller distances such as 20 nm relative to 100 nm. Energy conversion efficiency of the TPV system 100 increases as the gap decreases from mm-to-nm distances. Also, the maximum electrical power output of the TPV system 100 decreases when the TPV cell 106 temperature increases regardless of the gap distance from the emitter. The power output drops with increasing cell temperature and especially more at temperatures greater than approximately 400 K. The photocurrent increases slightly at temperatures from approximately 300 K to about 425 K and then decreases for cell temperatures greater than approximately 425 K. The emitter 104 is ideally maintained at a constant and uniform temperature via the heat source 102 input. Because it is important to maintain the cell temperature within a narrow range at around approximately 400K at a nanoscale gap, the demand for efficiently cooling the TPV cell 104 is robust.

Figure 4:
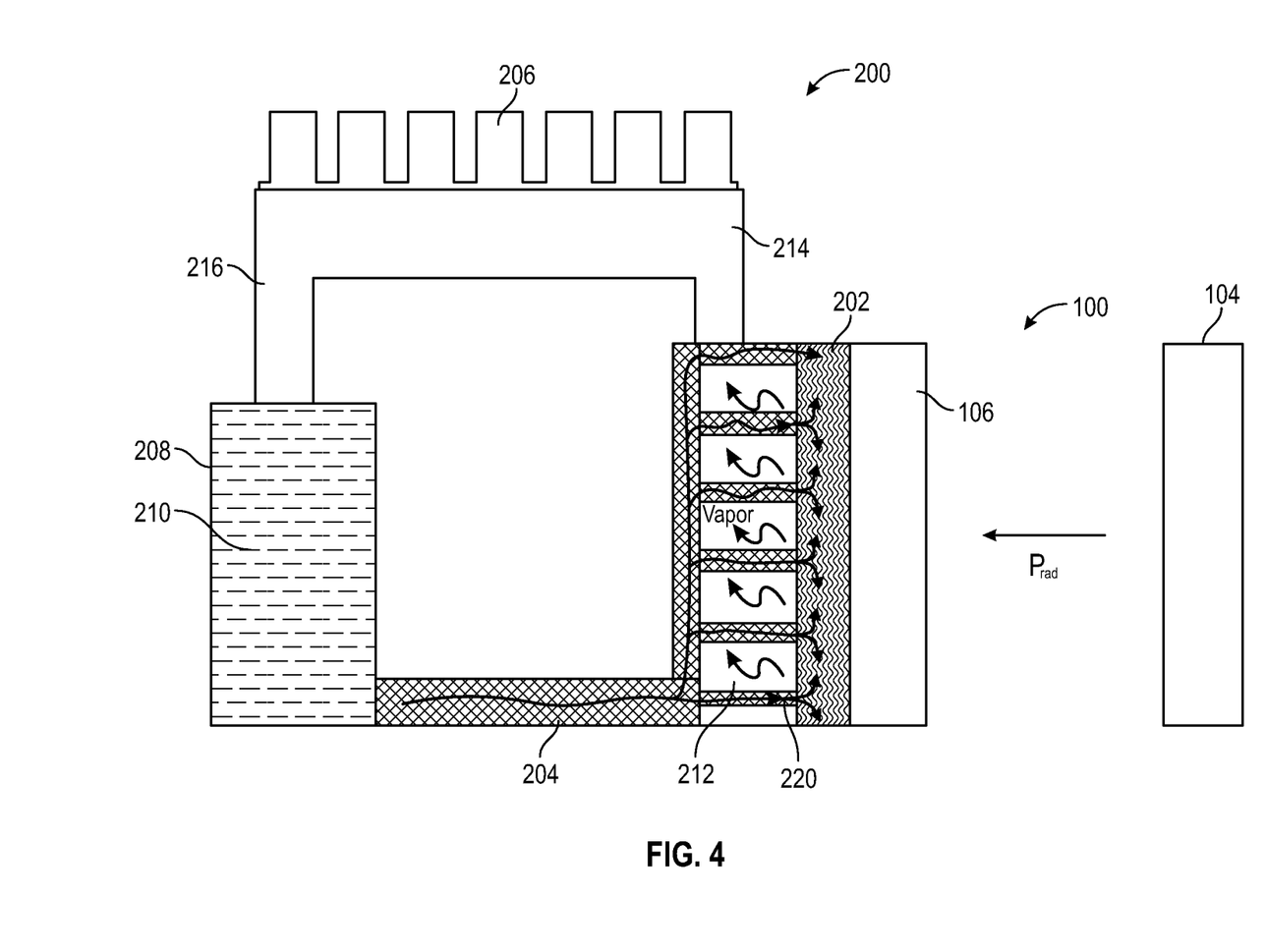
FIG. 4 is a schematic diagram of a TPV system, according to one or more embodiments.

FIG. 4 is schematic diagram of a cooling system 200 coupled to the backside of a TPV cell 106 (or substrate 126) or array of cells 106 according to an exemplary embodiment.

In FIG. 4, the TPV cell 106 is shown spaced apart from an emitter 104 of a TPV system 100. The cooling system 200 is configured to receive thermal energy and reduce the temperature of the TPV cell 106 resulting from radiative power $P_{rad}$ from the emitter 104 hitting the TPV cell 106. The cooling system 200 is ideally configured to keep the TPV cell 106 at a constant temperature in order to enhance the output efficiency and performance of the TPV cell 106. The cooling system 200 includes an evaporator 202 in thermal communication with one or more TPV cell 106. The cooling system 200 further includes a wick 204 fluidly connected to the evaporator 202, a condenser 206 coupled to the evaporator 202, a reservoir 208 connected between the condenser 206 and wick 204, and a working fluid 210. The various components of the cooling system are enclosed in a housing (not shown) with a fluid inlet to the wick 204 and a vapor outlet from the evaporator vapor space 212.

The evaporator 202 is thermally coupled along the backside of the TPV cell 106 from the bottom to the top. The TPV cell 106 or array of cells 106 may be mounted with thermal adhesive on a thermally conductive plate or substrate 126 before being connected to the evaporator 202 or may be formed directly onto the TPV cell 106. The evaporator 202 forms a large area of contact with TPV cells 106 covering at least the entire backside area of the TPV cells 106. A protective boundary is defined between the cooling system 200 and the TPV cells 106 defining a closed system or fluid housing around the cooling system.

The evaporator 202 is made of porous media. The porous media may include a ceramic and/or metal foam wick. The ceramic or metal wick may be 3D printed. An example of a metal wick includes a copper wick formed by sintering copper particles in a graphite mold. An example 3D printed wick may be fabricated out of alumina. The porous media may be uncoated or coated with various coatings to increase two-phase heat transfer through enhanced bubble nucleation and/or to affect the hydrophilicity of the material for enhanced fluid delivery through capillary action. The pore density, porosity, and/or permeability of the wick may be selected or designed to provide the desired thermal resistance and capillary pressure across the evaporator 202 to achieve uniform fluid delivery and cooling. Average pore densities may range from approximately 10-30 pores per inch (PPI), although other pore densities, corresponding porosity, and permeabilities are conceivable. Pore density, porosity, and/or permeability may be constant throughout the entire evaporator 202. In another embodiment, the pore density, porosity, and/or permeability may vary across the thickness of the evaporator 202 such that permeability is lower at the backside of the TPV cell 106 and increases with distance away from the TPV cell 106. In another embodiment, the permeability is higher at the backside of the TPV cell 106 and decreases with distance away from the TPV cell 106. The average or median pore size may be constant throughout the evaporator 202. In another embodiment, the average or median pore size may vary within the evaporator 202 or define a gradient of pore size with distance across the width of the evaporator 202 from the TPV cell 106. The wick pore structure may be interconnected to form passages for accommodating heat and vapor produced from evaporative cooling of the working fluid 210. Pores may increase in size to widen the vapor space in the direction of vapor flow in order to minimize flow resistance to vapor escape in the cooling system 200. In one embodiment, pore size may also remain uniform throughout the evaporator 202. In another embodiment the pore size of the evaporator 202 near and along the wick 204 may be configured for optimal capillary action to aid in wicking the working fluid 210 into the evaporator 202. The interconnected passages defined by the pore structure may be further in fluid communication with multiple larger channels or surrounding vapor space 212 to transfer heat and vapor rapidly therefrom by convection into a main channel 214 toward the condenser 206.

The three dimensional (3D) porous media wick provides an effective heat sink with unique heat transfer properties including convective, conduction, and radiative behavior with an ability to withstand high heat and generate more uniform cooling along the TPV cell 106 module when compared with an air-cooled or single-phase liquid-cooled heat sink. The increased surface area of porous material increases heat dissipation and evaporative cooling. Two-phase heat transfer in the porous material advantageously provides an improvement in temperature distribution and heat transfer critical to maintaining the TPV cell 106 at a constant temperature. Better control of fluid delivery and the temperature level in the evaporative zone also assists in preventing boiling and dry out of the working fluid 210.

The wick 204 is coupled to the backside of the evaporator 202. The wick 204 includes a first end in fluidic communication with the reservoir 208 where the wick 204 may be immersed in the working fluid 210 contained in the reservoir 208 where the wick 204 remains in constant contact with the liquid phase of the working fluid 210. The wick 204 is configured to absorb the working fluid 210, contain it and transport it. The wick 204 forms a 3D feeding structure interconnecting the reservoir 208 with the evaporator 202 to deliver the working fluid 210 from the reservoir 208 at the first end to the evaporator 202 at a second end. The arrows in FIG. 4 illustrate the directional pathway of working fluid 210 delivery from the first end to the second end of the wick 204, into the evaporator 202, and then as vapor through the pores of the evaporator 202 and into the larger channels 212 before entering the main channel 214.

The wick 204 extends along three axes with the x, y axes lying in the plane of the paper and the z axis extending perpendicularly to the plane of the figure to form a 3D wick 204. The 3D structure of the wick 204 provides for uniform working fluid delivery across the entire backside of the evaporator 202. In one embodiment, the vapor space 212 is interspersed with the wick 204 forming multiple wick fingers 220 connecting to the evaporator 202 as shown in FIG. 4. The wick fingers 220 aid in delivering the working fluid 210 uniformly along the height of the evaporator 202. When the working fluid 210 reaches the backside of the evaporator 202 at the boundary with the wick 204, the working fluid is dispersed into the porous medium of the evaporator 202. The wick 204 is in thermal and fluidic communication with the evaporator 202. The wick 204 distributes working fluid 210 locally to the porous structure of the evaporator 102. The working fluid 210 is moved and evaporated by heat at the evaporator 202. In another conceived configuration, the emitter 104, TPV cell 106, and evaporator 202 of the cooling system may be oriented horizontally (instead of vertically as shown) allowing for the wick 204 to deliver fluid horizontally and then down to vertically oriented wick fingers 220 thus providing fluid delivery in the direction of gravity.

The wick 204 is constructed of a porous media having an interconnected pore structure and pore size configured for delivering working fluid 210 via capillary action. The delivery of working fluid 210 by capillary action is balanced by the reservoir fill level or pressure head. The porous media may include ceramic and/or metal wick material. An example of a ceramic material for the wick 204 includes alumina. The ceramic or metal porous media may be 3D printed. An example of a metallic porous structure includes a copper wick formed by sintering copper particles in a graphite mold. The porous structure may be uncoated or coated with various coatings to affect its hydrophilicity. The pore density, size, and permeability may be selected to provide effective delivery of working fluid 210 through the wick 204 via capillary action. Pore size, pore density, and permeability may be constant throughout the entire wick 204. The wick 204 provides for precise and controlled 3D fluid delivery across the large area of the evaporator 202. The wick 204 ensures the continuity of contact between the porous media evaporator 202 and the liquid phase of the working fluid 210 along the entire length of the evaporator 202. The capillary draw of the liquid phase of the working fluid 210 to the evaporation sites along the evaporator 202 advantageously prevents problems associated with boiling and dry out.

The condenser 206 is interconnected between the evaporator 202 and working fluid reservoir 208 via a cooling system housing (not shown). The vapor phase of the working fluid 210 travels from the evaporator 202 to the vapor space 212 to interconnect with the main channel 214 leading to the condenser 214. The main channel 214 is in thermal communication with the condenser 206. The liquid phase of the working fluid 210 reaches the evaporator 202 where heat from the TPV cells 106 vaporizes the working fluid 210 cooling the TPV cell 106. The vapor travels to the condenser 206 generally by a vapor buoyancy effect. The vapor phase of the working fluid 210 is cooled at the condenser 206 converting it back to its liquid phase prior to returning to the reservoir 208 via a downcomer 216. The condensed working fluid 210 moves downwards due to the force of gravity into the reservoir 208. Heat from the vapor is dissipated to an outside environment. To facilitate heat dissipation, the condenser 206 may be provided with a plurality of heat dissipation fins. The heat at the outside may be recovered and used to heat the emitter 104. Alternatively, the vapor may be converted back to liquid using a compressor (not shown) in combination with the condenser 206.

The reservoir 208 is configured for containing the working fluid 210. The reservoir 208 is in fluidic communication between the downcomer 216 and the feeding wick 204. The working fluid 210 is collected from the condenser 206 and stored in the reservoir 208. Part of the working fluid 210 is contained at the first end of the wick 204.

The working fluid 210 is a two-phase coolant that undergoes an evaporative phase change after absorbing heat from the TPV cell 106. Any two-phase coolant may be employed such as water, hydrocarbons, pentanes, alkanes, ketones, alcohols and the like. The working fluid 210 is compatible with the other materials so that they do not react chemically or cause deleterious effects. Heat of the TPV cell 106 is transferred to the working fluid 210 in a sealed closed system. A pump may be included to increase the pressure differential to promote and control the flow of working fluid 210 from the reservoir 208 toward the evaporator 202. The pump may be installed just after the reservoir 208.

The liquid phase of the working fluid 210 is drawn via capillary action from the reservoir 208 into the wick 204 and delivered uniformly to the evaporator 202. At the evaporator 202, heat from the TPV cell 106 module is absorbed by the working fluid 210 converting it into its vapor phase. The vapor is directed via the vapor space and channels 212, 214 to the condenser 206 where the working fluid 210 is cooled and converted into its liquid phase. In the liquid phase, the working fluid 210 falls via the downcomer into the reservoir 208. The process is repeated to continuously cool the TPV unit maintaining the TPV cells 106 at constant temperature.

Figure 5:
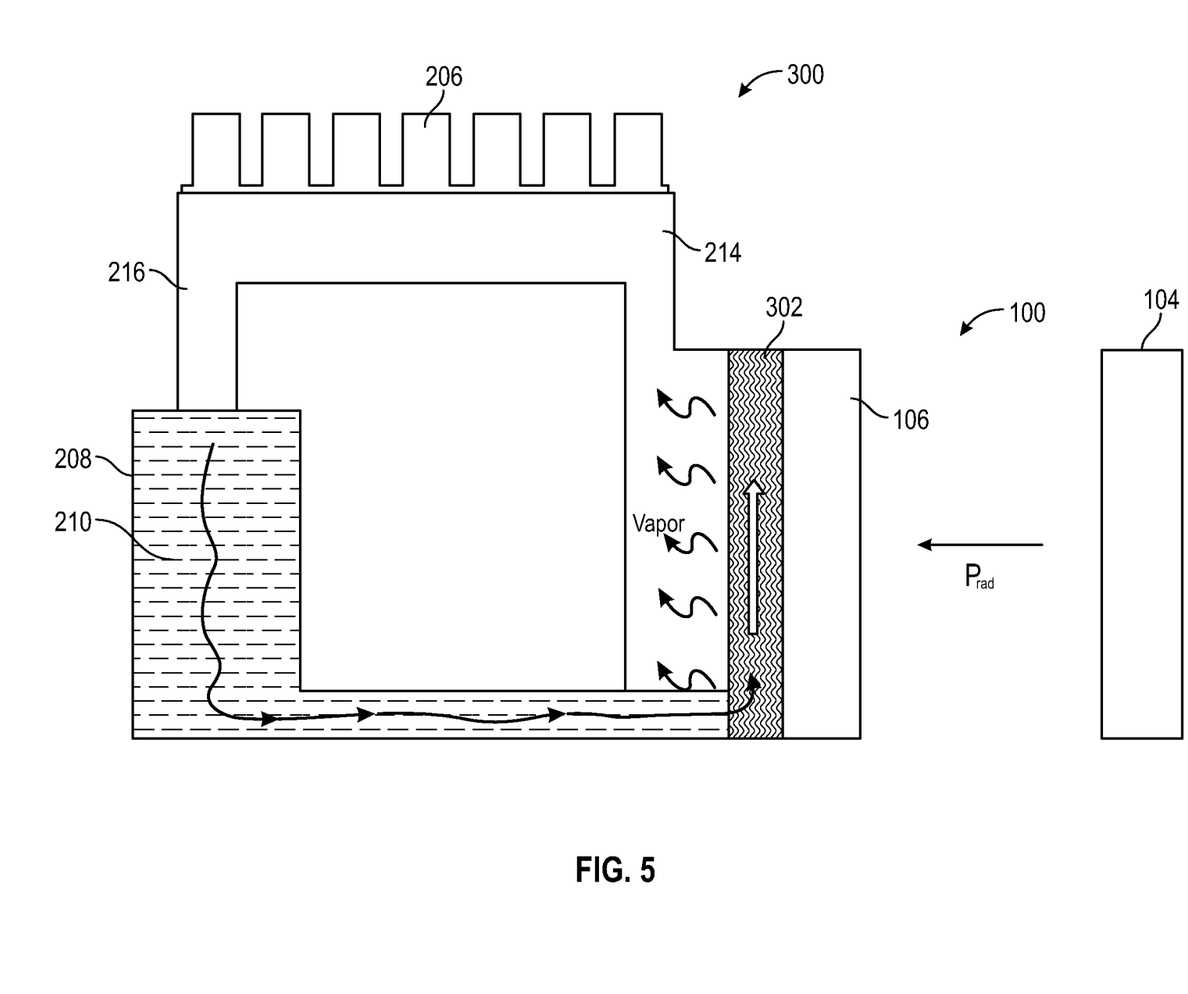
FIG. 5 is a schematic diagram of a TPV system, according to one or more embodiments.

FIG. 5 illustrates another embodiment in which like reference numbers are used to describe like parts. FIG. 5 is schematic diagram of a cooling system 300 coupled to the backside of a TPV cell 106 or array of cells 106. In FIG. 5, the TPV cell 106 is shown spaced apart from an emitter 104 of a TPV system 100. The cooling system 300 is configured to receive thermal energy and reduce the temperature of the TPV cell 106 resulting from radiative power from the emitter 104 hitting the TPV cell 106. The cooling system 300 is configured to keep the TPV cell 106 at a relatively constant temperature to enhance the output efficiency and performance of the TPV cell 106. The cooling system 300 includes a wick 302 in thermal communication with one or more TPV cell 106, a condenser 206 coupled to the wick 302, a reservoir 208 connected between the condenser 206 and the wick 302, and a working fluid 210.

The wick 302 is thermally coupled directly to the backside of the TPV cell 106. The TPV cell 106 or array of cells 106 may be mounted with thermal adhesive on a thermally conductive plate or substrate before being connected to the wick 302. The wick 302 forms a large area of contact with the TPV cells 106 covering at least the entire backside area of the array of TPV cells 106. A protective boundary or housing for preventing escape of working fluid is formed between the TPV cells and the wick 302. The wick 302 includes a first end in fluidic communication with the reservoir 208. The first end of the wick 302 may be immersed in the liquid phase of the working fluid 210. The first end of the wick 302 remains in constant contact with the liquid phase of the working fluid 210. The wick 302 is configured to absorb the working fluid 210, contain it and transport it along the length of the wick 302 away from the first end. The wick 302 forms a 3D evaporative heat sink for drawing heat from the TPV cells 106. The arrows in FIG. 5 illustrate the directional pathway of working fluid 210 as it moves through the reservoir 208. In one embodiment, the working fluid 210 moves laterally along the bottom of the cooling system 300 to the wick 302 positioned oppositely from the reservoir 208 as shown in FIG. 5. The working fluid 210 wets the first end of the wick 302. In one embodiment, the first end of the wick 302 is immersed into the liquid phase of the working fluid 210. The working fluid 210 moves upwardly from the bottom or first end toward the top or second end of the wick 302. The wick 302 extends along three axes with the x, y axes lying in the plane of the paper and the z-axis extending perpendicularly to the plane of the figure to form a 3D wick pillar. The 3D wick 302 has a block, columnar, or cylindrical shape depending on the design of the cooling system 300. The 3D structure of the wick 302 provides for 3D working fluid delivery along the entirety of the wick 302 from the first end to the second end for uniform cooling along the backside of the TPV cells 106. In another conceived configuration, the emitter 104, TPV cell 106, and wick 302 of the cooling system 300 may be oriented horizontally (instead of vertically as shown) allowing for the wick 302 to deliver fluid horizontally across the TPV cell 106, thus providing fluid delivery that does not work in opposition to the direction of gravity.

The wick 302 is constructed of a porous media having an interconnected pore structure and pore size configured for delivering working fluid 210 via capillary effect. The delivery of working fluid 210 by capillary action is balanced by the reservoir fill level or pressure head. The porous structure of the wick may be made of ceramic and/or metallic material. An example of a ceramic material for the wick 302 includes alumina. The ceramic or metallic wick 302 may be 3D printed. A porous metal wick structure may be formed, for example, by sintering copper particles in a graphite mold. The wick 302 may also be made of a metal inverse opal structure (MIO), where a dissolvable polymer template is used for electrodeposition of the MIO structure. The 3D printed metal or ceramic wick or MIO structure may be fabricated directly on the backside of the TPV cell 106 (or intermediate substrate). The porous structure may be uncoated or coated with various coatings to affect its hydrophilicity. The pore density, porosity, and permeability may be selected to provide effective and uniform delivery of working fluid 210 through the wick 302 via capillary action. Median pore size, pore density, and permeability may be constant throughout the entire wick 302 or selected to provide precise and controlled 3D working fluid 210 delivery across the entire area of the wick 302. The capillary draw of the liquid phase of the working fluid 210 is facilitated by the evaporation of working fluid 210 caused by heat absorption by the wick 302. The working fluid 210 is a two-phase coolant that undergoes an evaporative phase change after absorbing heat from the TPV cell 106. The porous structure of the wick 302 accelerates the heat transfer from the TPV cell 106 to the wick 302. Optimized evaporation of the working fluid 210 occurs in the region of the wick 302 proximal to the TPV cells 106. Heat of the TPV cell 106 is transferred to the wick 302 and to the working fluid 210 in a sealed closed system. The constant wicking of working fluid 210 within the wick 302 prevents problems associated with boiling and dry out. A pump may be included to increase the pressure differential to promote and control the flow of working fluid 210 from the reservoir 208 toward the wick 302. The pump may be installed just after the reservoir 208.

Heat is carried away from the TPV cells 106 when the heat vaporizes the working fluid 210. The vapor travels through the pore structure of the wick 302 and into a main channel 214 that is in thermal communication with the condenser 206. The condenser 206 is interconnected between the wick 302 and the reservoir 208 such that the vapor phase of the working fluid 210 is cooled at the condenser 206 converting it back to its liquid phase prior to returning to the reservoir 208 via a downcomer 216. The condensed working fluid 210 moves downwards due to the force of gravity. Heat from the vapor is dissipated to an outside environment. To facilitate heat dissipation, the condenser 206 may be provided with a plurality of heat dissipation fins 218. The heat at the outside may be recovered and used to heat the emitter 104. The reservoir 208 is configured for containing the working fluid 210. The reservoir 208 is in fluidic communication between the downcomer 216 and the wick 302. The working fluid 210 is collected from the condenser 206 and contained in the reservoir 208. Part of the working fluid 210 is contained in at the first end of the wick 302. The process is repeated to continuously cool the TPV unit maintaining the TPV cells 106 at constant temperature.

Figure 6:
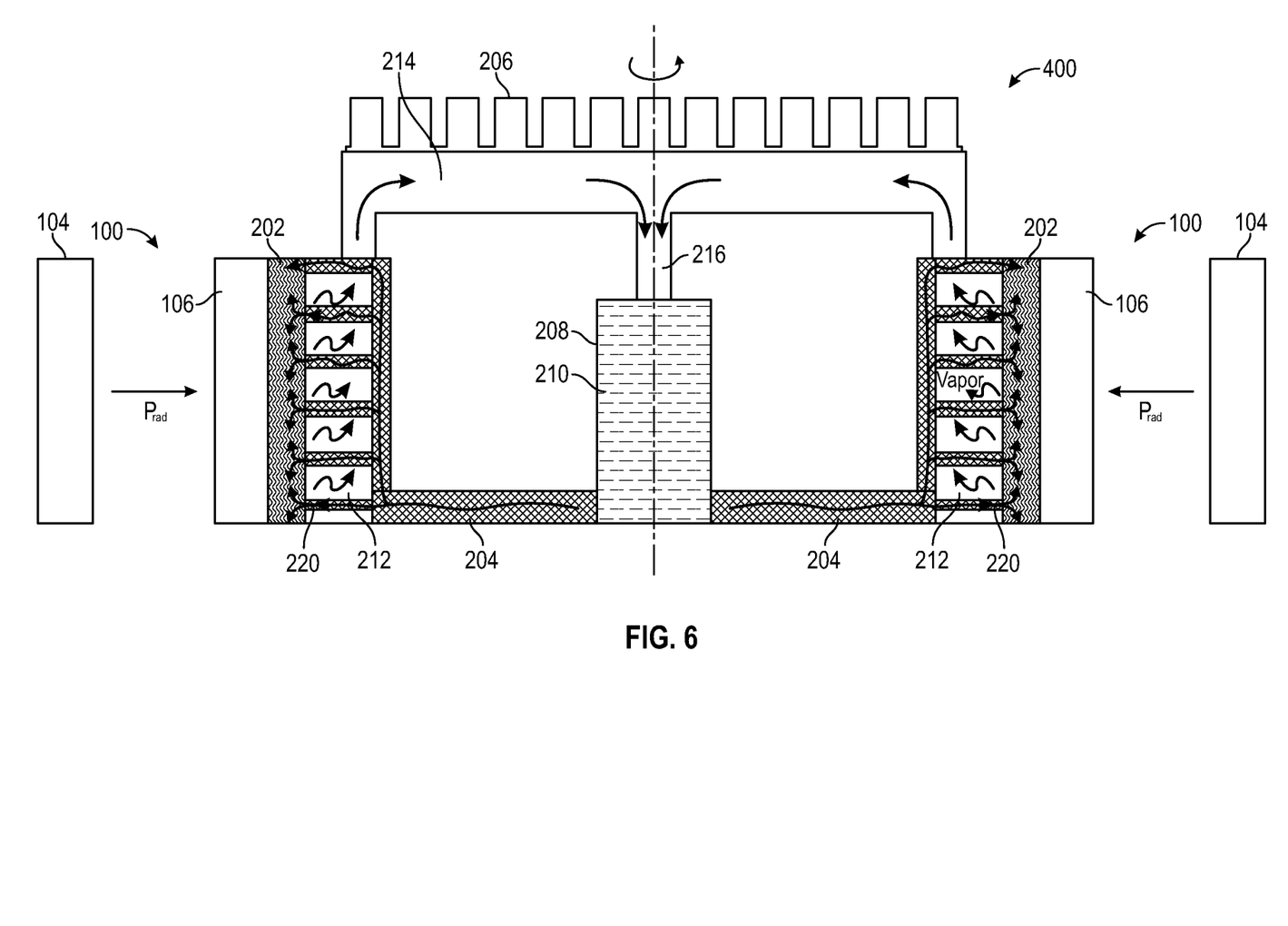
FIG. 6 is a schematic diagram of a TPV system, according to one or more embodiments.

FIG. 6 illustrates a configuration of a cooling system 400 according to another embodiment. The cooling system 400 of FIG. 6 is configured for a power block TPV system 100 for a large grid-scale application including one large array or multiple arrays of TPV cells 106 and corresponding emitters 104 and associated reactor(s). The configuration of FIG. 6 includes the cooling system 200 of FIG. 4 revolved continuously around a central axis. In another embodiment, the cooling system 300 of FIG. 5 may also be revolved around a central axis in a similar manner. The resulting cooling system 400 includes a central reservoir 208 that is encompassed by one large or more evaporator 202 spaced circumferentially around the perimeter of the cooling system 400. The evaporators 202 receive heat from a correspondingly encompassing large single array or multiple arrays of TPV cells 106 which, in turn, surrounded by one or more emitter 104. The evaporators 202 are interconnected such that vaporized working fluid 210 enters a common shared main channel 214 via the porous structure of the evaporator 202 and larger channels or vapor space 212. The main channel 214 collects vapor from all the evaporators 202 along the top of the cooling system 400. The main channel 214 is in thermal communication with a top-side condenser 206 extending above the main channel 214 to shed heat to outside of the cooling system 400. A central downcomer 216 extends along the central axis and is interconnected with the main channel 214 to direct condensed working fluid 210 into the central reservoir 208. The embodiment is not limited to a single downcomer 216. In another embodiment, multiple downcomers 216 may be included to direct working fluid 210 to the reservoir 208. Likewise, the central reservoir may be split into many individual reservoirs 208, as well. The cooling system 400 includes a single large wick 204 or multiple individual wicks 204 interconnected between the reservoir 208 and evaporator 202. The wick 204 extends laterally or radially outwardly away from the central axis where the central reservoir 208 is located. The wick 204 extends along the bottom of the cooling system 400 and then alongside the evaporators 202. The vapor space 212 may be included to interconnect the porous structure of the evaporators 202 to the main channel 214 to facilitate movement of the vapor into the main channel 214.

The cooling systems of exemplary embodiments provide an enhanced cooling mechanism for passive thermal management of TPV cells. The cooling systems set forth herein effectively dissipate the concentrated heat flux to maintain the temperature of the TPV cells in an acceptable range for the operation of the TPV system. Advantageously, the improved cooling systems permit a closer positioning of the TPV cells relative to the emitter, thereby, increasing the power output of the TPV system for the same cell temperature.

The above-described methods and systems may be readily combined together if desired. The term "coupled" may be used herein to refer to any type of relationship, direct or indirect, between the components in question, and may apply to electrical, mechanical, fluid, thermal, optical, electromagnetic, electromechanical, or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

We claim:

1. A thermophotovoltaic system, comprising:
an emitter configured to emit energy;
a thermophotovoltaic cell configured to absorb energy from the emitter and generate electrical power;
an evaporator comprised of porous media and having a frontside and a backside, the evaporator coupled to the thermophotovoltaic cell at the frontside of the evaporator and in thermal communication to absorb heat from the thermophotovoltaic cell;

a reservoir having a sidewall defining a volume containing a two-phase working fluid having a liquid phase and a vapor phase;

a wick made of porous media having a backside in fluidic communication with the reservoir and a frontside directly attached to the backside of the evaporator; the porous media of the wick being configured for delivery of the liquid phase of the working fluid from the reservoir to the evaporator by capillary action; and a condenser connected to the evaporator via a main channel by way of a vapor space and connected to the reservoir via a downcomer such that the vapor phase of the working fluid from the evaporator condenses into the liquid phase and returns to the reservoir;

wherein the sidewall of the reservoir is separated from the backside of the evaporator by the wick.

2. The thermophotovoltaic system of claim 1, wherein the backside of the wick is immersed in the liquid phase of the working fluid contained in the reservoir.

3. The thermophotovoltaic system of claim 1, wherein heat from the thermophotovoltaic cell causes a phase change of the working fluid to take place in the evaporator.

4. The thermophotovoltaic system of claim 1, wherein a frontside of the thermophotovoltaic cell faces the emitter, the frontside of the evaporator is attached to a backside of the thermophotovoltaic cell and the wick is configured to deliver the liquid phase of the working fluid uniformly along the backside of the evaporator.

5. The thermophotovoltaic system of claim 1, wherein the porous media of the evaporator has an interconnected pore structure.

6. The thermophotovoltaic system of claim 1, wherein the porous media of the wick has an interconnected pore structure configured to move the liquid phase of the working fluid from the reservoir to the evaporator.

7. The thermophotovoltaic system of claim 1, wherein at least part of the wick is configured to deliver working fluid downwardly to the evaporator in a direction parallel to gravity.

8. The thermophotovoltaic system of claim 1, wherein the wick is made of a 3D printed metal or ceramic, sintered copper, or electrodeposited metal inverse opal.

9. The thermophotovoltaic system of claim 1, wherein the evaporator is made of a 3D printed metal or ceramic, sintered copper, or electrodeposited metal inverse opal.

10. The thermophotovoltaic system of claim 1, further including a pump located after the reservoir.

11. A thermophotovoltaic system, comprising:
an emitter configured to emit energy;
a thermophotovoltaic cell configured to absorb energy and generate electrical power having a frontside facing the emitter;
a reservoir containing a two-phase working fluid; the working fluid having a liquid phase and vapor phase;
a wick made of porous media having a frontside surface directly attached to a backside of the thermophotovoltaic cell; the wick having a bottom end in fluidic communication with the reservoir; the wick having an interconnected pore structure configured for delivery of the liquid phase of the working fluid from the reservoir into the wick and along a length of the thermophotovoltaic cell via capillary action; and
a condenser connected to the wick via a main channel and connected to the reservoir via a downcomer;

wherein heat is transferred from the thermophotovoltaic cell to the working fluid inside the wick converting the working fluid into the vapor phase; wherein the vapor phase of the working fluid enters the main channel by way of a vapor space and is condensed into its liquid phase which returns to the reservoir via the downcomer.

12. The thermophotovoltaic system of claim 11, wherein the bottom end of the wick is immersed in the liquid phase of the working fluid.

13. The thermophotovoltaic system of claim 11, wherein the entire backside of the thermophotovoltaic cell is attached to the frontside of the wick.

14. The thermophotovoltaic system of claim 11, wherein the wick is made of a 3D printed metal or ceramic, sintered copper, or electrodeposited metal inverse opal.

15. A thermophotovoltaic system, comprising:
a central reservoir containing a two-phase working fluid; the working fluid having a liquid phase and vapor phase; the central reservoir having a top end and a bottom end interconnected by a sidewall;
at least one wick made of porous media having a proximal end in fluidic communication with the bottom end of the central reservoir and extending upwardly from the bottom end and at least, in part, surrounding the central reservoir;
at least one evaporator made of porous media; the evaporator having a frontside and a backside; the evaporator extending around and in fluidic communication with the wick such that working fluid is delivered by the wick via capillary action to the backside of the evaporator;
at least one thermophotovoltaic cell configured to absorb energy and generate electrical power; the thermophotovoltaic cell having a backside in thermal connection with the frontside of the evaporator;
at least one emitter arranged around the thermophotovoltaic cell and configured to emit energy toward the frontside of the thermophotovoltaic cell; and
a condenser connected to the evaporator via a main channel and connected to the central reservoir via a downcomer;
wherein, to cool the thermophotovoltaic cell, heat is transferred from the thermophotovoltaic cell to the evaporator converting the working fluid into the vapor phase;
wherein the vapor phase of the working fluid enters the main channel by way of a vapor space and is condensed at the condenser into its liquid phase and returns to the central reservoir via the downcomer; and
wherein the sidewall of the reservoir is separated from the backside of the evaporator by the wick.

16. The thermophotovoltaic system of claim 15, wherein the wick extends radially outwardly from the central reservoir along a bottom.

17. The thermophotovoltaic system of claim 15, wherein working fluid is delivered uniformly by the wick to and along the entire backside of the evaporator.

18. The thermophotovoltaic system of claim 15, wherein the wick has an interconnected pore structure and a pore size configured for delivery of the liquid phase of the working fluid from the central reservoir into the wick and upwardly along a length of the wick via capillary action.

19. The thermophotovoltaic system of claim 15, wherein the porous media of the wick and evaporator is made of 3D printed ceramic or metal.

20. The thermophotovoltaic system of claim 15, wherein the wick has a backside in fluid communication with the reservoir and a frontside in directly attached to the backside of the evaporator.

* * * * *